United States Patent [19]

Duncan

[11] Patent Number: 5,332,071
[45] Date of Patent: Jul. 26, 1994

[54] SHOCK ABSORBER FOR SAFETY CABLE SYSTEM

[75] Inventor: Charles W. Duncan, Costa Mesa, Calif.

[73] Assignee: SINCO Incorporated, East Hampton, Conn.

[21] Appl. No.: 28,393

[22] Filed: Mar. 9, 1993

[51] Int. Cl.$^5$ .............................................. F16F 7/12
[52] U.S. Cl. ........................................ 188/371; 267/74
[58] Field of Search .................. 267/69, 71, 74, 166, 267/167, 174, 178, 179; 188/371

[56] References Cited

U.S. PATENT DOCUMENTS

| | | | |
|---|---|---|---|
| 1,422,921 | 7/1922 | Bylund | 267/179 |
| 1,616,133 | 2/1927 | Lowy | 267/179 |
| 2,796,953 | 6/1957 | Becker | 188/371 |
| 4,120,489 | 10/1978 | Borlinghaus | 267/166 |
| 4,992,629 | 2/1991 | Morais | 267/74 |

OTHER PUBLICATIONS

Fall Arrest Systems, Inc., ManSafe TM Fall Arrest Systems Performance-Certified Safety Systems, date unknown.

Fall Arrest Systems, Inc., ManSafe TM Fall Arrest Systems CableGard TM Energy Absorber, date unknown.

Construction Safety Association of Ontario, Anray Energy Absorber disclosure, May 31, 1991.

*Primary Examiner*—Robert J. Oberleitner
*Assistant Examiner*—Chris Schwartz
*Attorney, Agent, or Firm*—Chilton, Alix & Van Kirk

[57] ABSTRACT

A shock absorber which is especially adapted for use in conjunction with a horizontal safety cable plasticly deforms under the impact load of a falling worker. The shock absorber has a break away housing so that upon inspection, the shock can be identified if it has been subjected to an impact. The absorber is also configured to impart a tautness to the safety cable and visually indicate the attainment of the preferred cable pre-tension force.

21 Claims, 4 Drawing Sheets

5,332,071

SHOCK ABSORBER FOR SAFETY CABLE SYSTEM

BACKGROUND OF THE INVENTION

This invention relates generally to cable systems which involve horizontal and vertical lifelines. More particularly, the present invention relates to cable systems which protect workers by means of connecting the worker with a safety cable.

Safety cable systems in the form of horizontal lifelines have been employed for a number of years to provide fall protection for workers on elevated structures. Conventional safety systems involve a lanyard which connects with a safety harness or a safety belt worn by the worker. The lanyard attaches to the cable and slides along the cable as the worker moves about the structure.

The most advantageous use of the horizontal lifeline occurs when the lifeline is sufficiently taut that the lifeline can also function as a steady rail for the worker. However, when the cable is sufficiently taut that the cable assumes a linear or substantially linear configuration, the resistance force magnitude required to effectively withstand the load impact of a falling worker becomes theoretically exceedingly large. In the event of a fall, the construction worker ordinarily generates many times his weight in the impact force exerted by the connector of the lanyard against the cable. Accordingly, the cable, the cable anchorage and/or the supporting structure are highly susceptible to failure. Any of the noted failures are antithetical to the central safety purpose of any safety cable system.

In order to ensure that the safety cable systems function for their intended results, i.e., to provide fall protection for the worker, governmental and regulatory agencies have implemented various standards. For example, a common regulatory standard requires that the anchorage for the cable be capable of withstanding at least 5,400 pounds. These latter minimal standards are often difficult to achieve and can be wholly impractical in the field because the required cable is quite heavy and very few portions of buildings, concrete, framework or scaffold are capable of supporting the minimum anchorage force during the construction phase.

In summary, general considerations dictate that in order to effectively decelerate a falling worker, a substantial resistance force must be exerted at the end of the lanyard. The resistance force is preferably exerted by an initially taut horizontal lifeline which remains taut after an initial sag has been imparted to the lifeline upon impact.

SUMMARY OF THE INVENTION

Briefly stated, the invention in a preferred form is a shock absorber for a safety cable system which preferably involves a horizontal lifeline. A metal rod is configured into a plurality of coils. The number, dimensions and other characteristics of the coils are selected to provide desired properties for a given application. The coiled rod has opposite first and second axial end segments. A housing, which may comprise a tube, encloses the coils. A pair of end caps are mounted to opposite ends of the tube. The first and second axial coil end segments project through openings in the end caps. The end caps are attached so that one cap axially separates from the tube when an axial force exerted against the end cap exceeds a pre-established threshold while the other end cap remains substantially fixed to the tube.

When the shock absorber is connected with the horizontal lifeline or cable, the coil functions to maintain a pre-established tautness to the lifeline. When the axial force exerted between the axial ends of the coil exceeds a pre-established threshold selected to be related to the impact force of a falling worker exerted on the lifeline, the coils plasticly deform and expand resistively to impart a sag to the cable and to absorb the impact energy. In addition, one end cap separates away from the tube, so that upon inspection, it can easily be determined that the shock absorber is no longer usable.

The first and second axial end segments are threaded. Nuts are mounted to the end segments. An eyenut and a yoke may also be secured to the threaded ends to connect the shock absorber in the lifeline system. In one form of the invention, the coils are formed from a steel alloy rod which has work hardening characteristics.

An object of the invention is to provide a new and improved horizontal safety cable system.

Another object of the invention is to provide a new and improved shock absorber for a safety cable system.

A further object of the invention is to provide a new and improved shock absorber which initially imparts a tautness to an attached horizontal safety cable and is capable of plastic deformation to provide a controlled resistive expansion to the cable upon impact due to the fall of the worker.

A yet further object of the invention is to provide a new and improved shock absorber which has readily visible means for determining that the shock absorber is no longer usable upon inspection.

A yet further object of the invention is to provide a new and improved shock absorber having means to determine when the pre-established maximum cable pre-tension force is reached.

Other objects and advantages of the invention will become apparent from the drawings and the specification.

DETAILED DESCRIPTION OF THE PREFERRED EMBODIMENT

Figure 1:
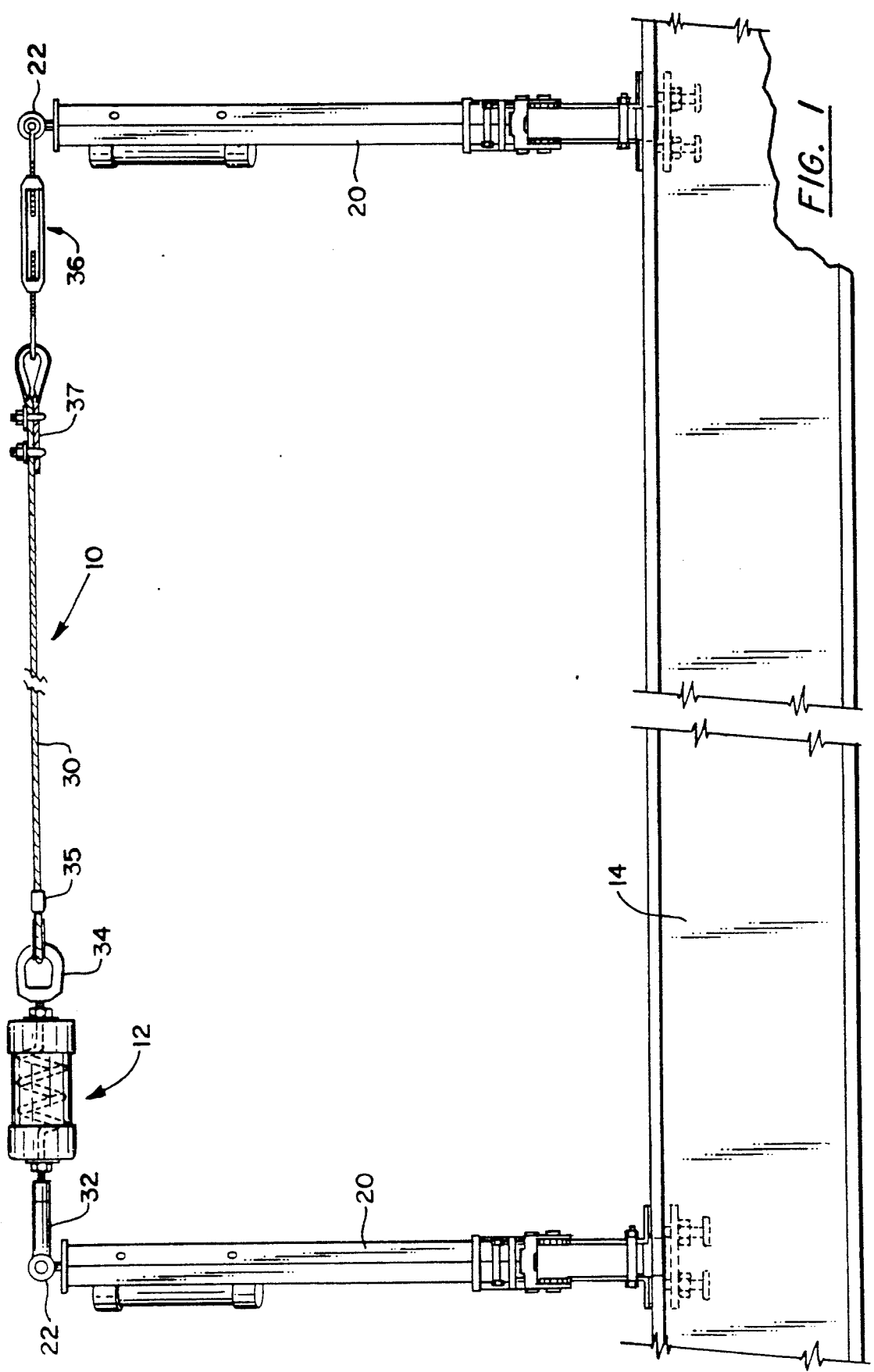
FIG. 1 is a front elevational view, partly broken away and partly in phantom, of a safety cable system incorporating a shock absorber in accordance with the present invention.

With reference to the drawings wherein like numerals represent like parts throughout the Figures, a safety cable system is designated generally by the numeral 10. In accordance with the present invention, the safety cable system employs a shock absorber 12. Safety cable system 10 is intended to be exemplary of any of numerous safety cable systems which employ a generally horizontal lifeline or cable. The shock absorber 12 may also be employed in vertical lifeline systems or other safety cable systems.

The safety cable system 10 is suspended above a structural I-beam 14. Stanchions 20 are mounted to upper flanges of the I-beam 14. The stanchions 20 are typically spaced from 10 to feet apart. The stanchions 20 upwardly terminate in connecting eyes 22 which connect with various hardware for supporting a horizontally disposed safety cable 30. Shock absorber 12 connects via a yoke 32 which is pinned or bolted to one of the stanchions. An eyenut 34 at the opposing end of the shock absorber receives a loop of the safety cable which is secured by a cable swage 35. A turnbuckle connector 36 connects the opposite end of the safety cable with a second stanchion 20. The cable is secured by a cable clip 37. Alternately, eyenuts 34 may be connected at both ends of the shock absorber. It should be appreciated that the shock absorber 12 may be connected with a horizontal safety lifeline in a wide variety of configurations. In some applications, stanchions are not employed, and the shock absorber 12 and safety cable 30 are anchored to portions of the structure under construction.

The stanchions 20 are preferably angled so that the safety cable 30 functions as a steady cable rail for the construction worker as the worker moves along the I-beam 14. The construction worker wears a safety harness or a safety belt (neither illustrated) which tie off via a lanyard (not illustrated) which slides along the safety cable. Should a worker accidently fall, the safety cable 30 will slightly sag, as described below, and will provide sufficient resistance force to the end of the lanyard so that the fall of the worker may be effectively limited and serious injury to the worker may be avoided.

Figure 2:
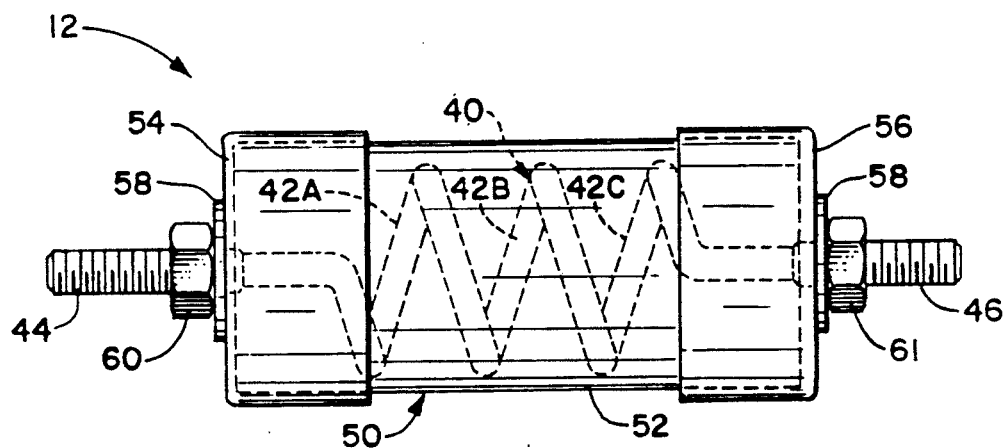
FIG. 2 is a side sectional view, partly in phantom and partly broken away, of the shock absorber of FIG. 1.
Figure 3:
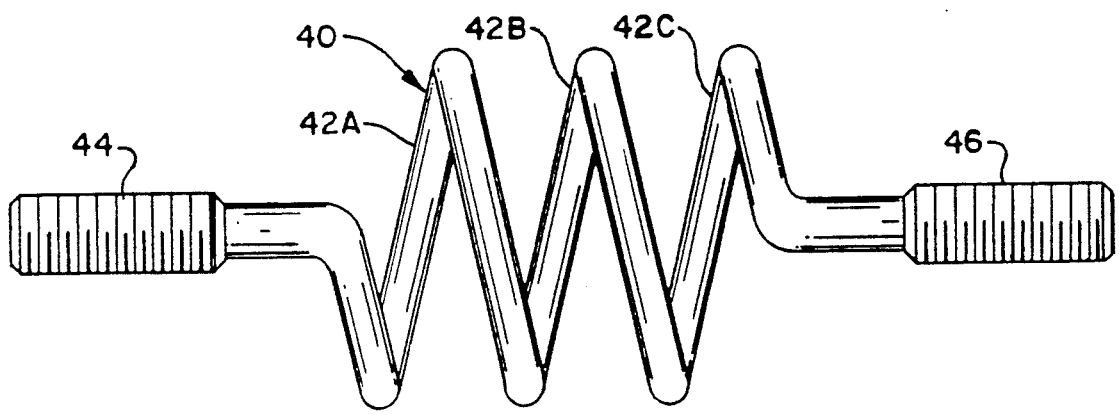
FIG. 3 is a side elevational view of a coil member of the shock absorber of FIG. 2.
Figure 4:
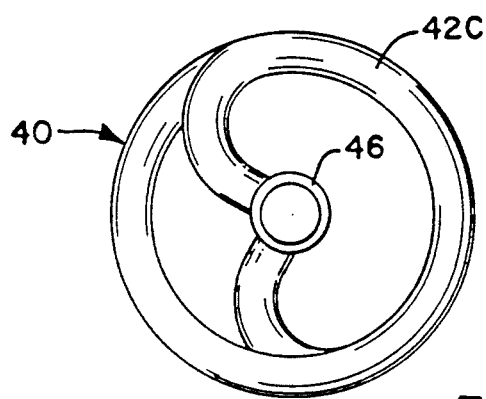
FIG. 4 is an end view of the coil member of FIG. 3, viewed from the right thereof.

With reference to FIGS. 2 through 4, the shock absorber 12 comprises a coil member 40 which is preferably formed from a low carbon steel rod. In one embodiment of the invention, coil member 40 is formed from a steel alloy rod having work hardening characteristics. The coil member 40 includes three helical coils 42A, 42B and 42C and generally colinear opposite axial end segments 44 and 46. The end segments 44 and 46 are each threaded. It should be appreciated that the coil member may assume a wide range of configurations, including variations In the number, diameter, pitch and spacing of the coils. The coil member 40 is designed to have a pre-established elastic deformation range and a distinct pre-established plastic deformation range. In the elastic range, the coil member 40 functions as a spring. The number, diameter, pitch and spacing of the coils as well as the composite material of the coil member 40 are selected to provide desirable proportions for a given application.

In one embodiment of coil member 40 having a diameter of 0.5 inches, the axial expansion (deflection in inches) of the coil member as a function of load (tension in pounds) was measured. The elastic threshold was approximately 500 pounds with less than 0.5 inch deflection. The slope of the plastic range was generally linear until approximately 5000 pounds (approximately 14.5 inches deflection) at which point the slope increased due to work hardening characteristics of the coil member material.

A housing 50 preferably encloses the coils 42. The housing comprises an open ended plastic tube 52. Close-fitting end caps 54 and 56 which include central axial openings for receiving the first and second end segments are mounted to opposite ends of the tube. End cap 54 is fixedly secured to the tube 52 by means of an adhesive. A flat washer 58 exteriorly engages end cap 54 and a jam hex nut 60 is threaded against the washer 58 so that a substantial threaded portion of end segment 44 is exposed. The second end cap 56 is significantly less fixedly secured to the second end of the tube by means of a very light application of adhesive. The housing is specifically designed so that the end cap 56 separates from the tube 52 upon application of a substantially smaller axial force than would be required to separate the first end cap 54 from the housing. A flat washer 58 and a second hex nut 61 are mounted to segment 46, and the nut 61 is tightened so that washer 58 engages against the end cap 56.

Figure 5:
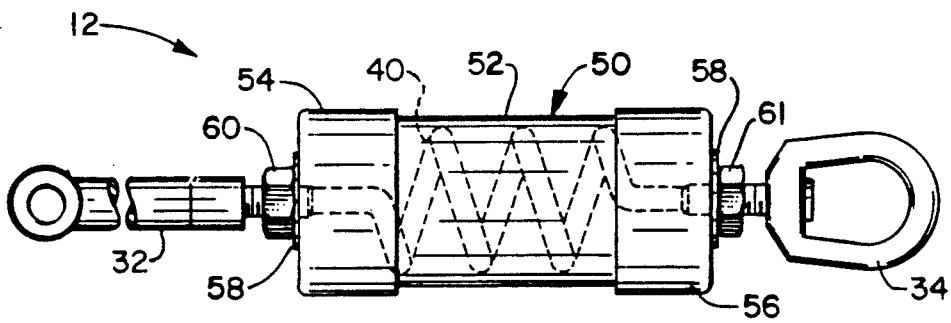
FIG. 5 is a side elevational view, partly in phantom, of the shock absorber and associated hardware of FIG. 1, illustrating the shock absorber in a non-loaded state.
Figure 6:
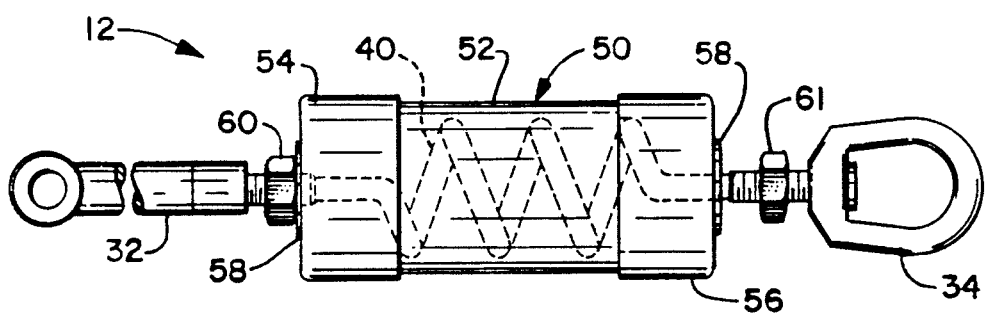
FIG. 6 is a side elevational view, partly in phantom, of the shock absorber and hardware of FIG. 5, illustrating the shock absorber in a loaded elasticly deformed state mounted to a horizontal cable lifeline.
Figure 7:
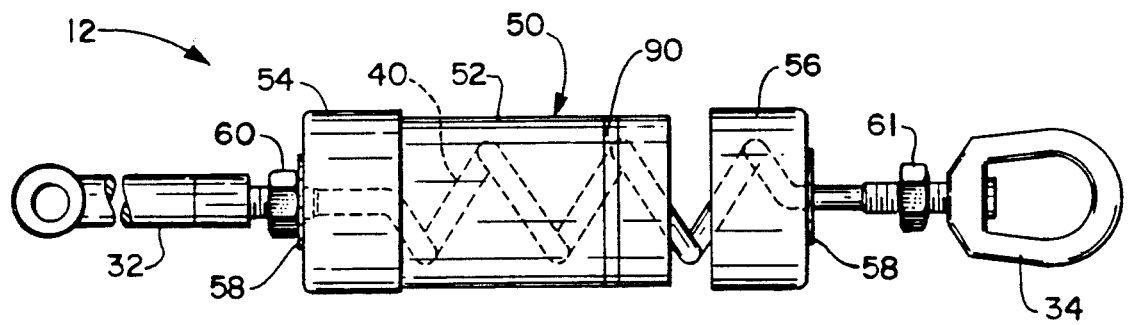
FIG. 7 is a side elevational view, partly in phantom of the shock absorber and hardware of FIG. 5, illustrating the shock absorber in an impacted plasticly deformed state.

With additional reference to FIGS. 5 through 7, the end segment 44 preferably threadably mates with the yoke 32 which in turn is pinned or bolted to the stanchion 20. The eyenut 34 threads to the second end segment 46 for connecting the shock absorber with the horizontal safety cable 30. In an unloaded state, the shock absorber 12 substantially assumes the configuration illustrated in FIG. 5.

Figure 8:
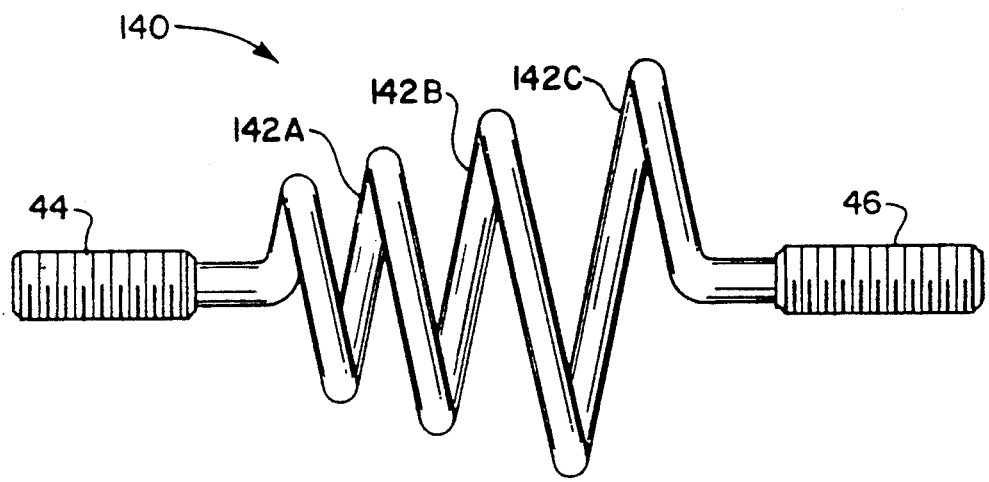
FIG. 8 is a side elevational view of a second embodiment of a shock absorber in accordance with the present invention.
Figure 9:
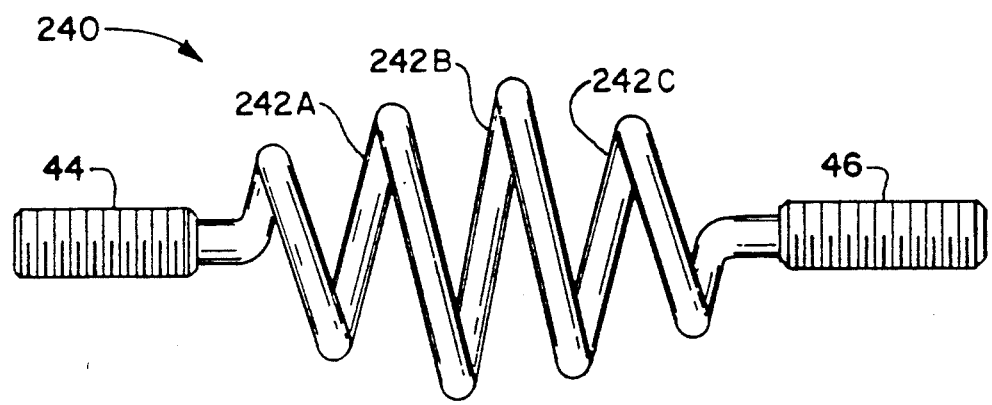
FIG. 9 is a side elevational view of a third embodiment of a shock absorber in accordance with the present invention.

With reference to FIG. 8, coil member 140 has a conical coil configuration with coils 142A, 142B and 142C having progressively greater coil diameters. A plot of the axial expansion of coil member 140 versus tension in the cable would exhibit a greater slope in the plastic range than the corresponding slope for coil member 40. Another embodiment of a coil member designated by numeral 240 is illustrated in FIG. 9.

When the shock absorber 12 is connected with the horizontal cable 30, the coil member 40 exerts an elastic force which maintains a tautness in the cable at an optimum pre-established tension. The lifeline may be tightened to a tension which causes the end cap 56 to loosen but not separate from the tube. The optimum pre-tension in the safety cable may be observed by movement of nut 61 and/or by displacement of the end cap 56. The displacement may be visually dramatically indicated by color markings 90 (FIG. 7) or other indicator affixed to the tube. The tension is a function of the distance that the jam nut 61 is displaced from the end cap 46, as best illustrated in FIG. 6 (displacement is exaggerated in drawing for illustration purposes). The resistive tension imparted by the shock absorber 12 helps the safety cable 30 maintain a nearly linear taut configuration and pre-loads and pre-stretches the cable.

In the event that a worker falls, the impact force exerted on the safety cable is sufficient to plasticly deform and resistively expand the coil member 40, as illustrated in FIG. 7. The coil member deforms to impart a sag to the safety cable. The plastic deformation of the coil member 40 absorbs energy so that the safety cable can effectively withstand the impact load imparted by the falling worker. As a consequence of the plastic deformation, portions of the coil member engage the interior end of cap 56 with sufficient force to displace the end cap from the end of the tube 52, as best illustrated in FIG. 7. Because the displacement of the end cap from the tube is readily visible upon inspection, the shock absorber will be readily identified as requiring replacement and will not be reused.

It should be appreciated that some embodiments of the coil member 40 may have a work hardening characteristic so that as the load increases, due to the impact, the coil member essentially increases in hardness and imposes a consequent resistance to further deformation. The elastic and plastic deformation characteristics of the coil member are selected so that the coil member will function as a spring to impart a sufficient tautness to the horizontal cable in a first pre-established axial load range while also undergoing a plastic deformation without breaking under the impact load of a falling worker in a second pre-established axial load range. For some embodiments, the housing 50 is omitted or other housing embodiments are employed, and the coil member 40, 140 or 240 is connected into the safety cable system.

In one embodiment of the invention, the coil member 40 was formed from a threaded steel rod having a diameter of ½ inch and a coil diameter of approximately 3¼ inches with the crests of the coils 42 being spaced approximately 1¾ inches apart and having a finished unloaded axial length of approximately 13⅝ inches. The housing 52 was manufactured from PVC plastic pipe having a diameter of 3 inches and an axial length of approximately 7 inches. The end caps 54 and 56 were also constructed by modifying standard caps for such pipe.

While a preferred embodiment of the invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A shock absorber for a safety cable system having a safety cable, said shock absorber comprising:
   coil means comprising at least one coil and opposite first and second axially spaced end segments wherein said coil means has an elastic deformation range and said coil means functions as a spring to exert a tension force to maintain the cable in a taut configuration in the elastic deformation range; and
   housing means comprising a housing enclosing said at least one coil and having an axial end portion,
   so that when an axial force exerted between said end segments exceeds a preestablished threshold, said at least one coil plasticly deforms and said axial end portion separates from the rest of said housing.

2. The shock absorber of claim 1 wherein the first and second end segments are threaded.

3. The shock absorber of claim 2 further comprising a washer engageable against opposite axial end portions of said housing and nuts threaded to said end segments for securing said washers thereto.

4. The shock absorber of claim 1 wherein said first and second end segments are colinear.

5. The shock absorber of claim 1 wherein opposite end portions of said housing comprise end caps, said end caps comprising means defining an opening, and said end segments extend axially through said openings.

6. The shock absorber of claim 1 wherein said coil means comprises a steel alloy rod having work hardening characteristics.

7. A safety cable system comprising:
   a safety cable;
   a shock absorber connected with said safety cable wherein said shock absorber has an elastic deformation range and said shock absorber exerts a force to maintain said cable in a taut configuration in the elastic deformation range, said shock absorber comprising:
   coil means comprising a plurality of coils and having opposite first and second axially spaced end segments;
   so that when an impact force exerted on said cable exceeds a pre-established impact threshold, said coils plasticly deform and said second end segment is displaced relative to said first end segment.

8. A shock absorber for a safety cable system having a safety cable, said shock absorber comprising:
   coil means comprising a metal rod configured in a plurality of coils and having opposite first and second axial end segments wherein said coil means has an elastic deformation range and said coil means functions as a spring to exert a tension force to maintain the cable in a taut configuration in the elastic deformation range; and
   housing means comprising a tube enclosing said coils and having opposite first and second end caps, said first end cap being fixedly attached to said tube and said second end cap being semi-fixedly attached to said tube so as to detach from said tube when an axial force against said second end cap exceeds a preestablished threshold,
   so that when an axial force exerted between said end segments exceeds the preestablished threshold, said coils plasticly deform.

9. The shock absorber of claim 8 wherein the first and second end segments are threaded.

10. The shock absorber of claim 9 further comprising nuts threaded to said end segments and an eyenut mounted to a said end segment.

11. The shock absorber of claim 10 further comprising a washer disposed between said first end cap and a said nut.

12. The shock absorber of claim 8 wherein said first and second end segments are colinear.

13. The shock absorber of claim 8 wherein said end caps each comprise means defining an opening and said end segments extend axially through said openings.

14. The shock absorber of claim 8 wherein said rod has a steel alloy composition having work hardening characteristics.

15. A shock absorber for a safety cable system having a safety cable, said shock absorber comprising:
   coil means comprising a plurality of coils and having opposite first and second axially spaced end segments, said coils having an elastic and a plastic deformation range wherein said coil means functions as a spring to exert a tension force to maintain the cable in a taut configuration in the elastic deformation range; and
   housing means for enclosing said coils and comprising selective inspection means for maintaining a first structural configuration when said coil means is subjected to an axial load in the elastic range and for transforming to a second configuration when said coil means is subjected to an axial load in the plastic range.

16. The shock absorber of claim 15 wherein the first and second end segments are threaded.

17. The shock absorber of claim 15 wherein said first and second end segments are colinear and define a central axis about which said coils helically extend.

18. The shock absorber of claim 15 wherein said coil means comprises a steel rod having work hardening characteristics which resistively limit deformation in the plastic deformation range.

19. The shock absorber of claim 15 further comprising means for indicating that the coil means is subjected to a pre-established tension in the elastic range.

20. A safety cable system comprising:
a safety cable;
a shock absorber connected with said safety cable, said shock absorber comprising:
coil means comprising a plurality of coils and having opposite first and second axially spaced end segments wherein said coil means has an elastic deformation range and said coil means functions as a spring to exert a tension force to maintain said cable in a taut configuration in the elastic deformation range; and
housing means comprising an enclosure for enclosing said coils and having opposite first and second end portions, said second end portion being displaceable relative to said first end portion when an axial force exerted against said coil means exceeds a preestablished threshold,
so that when an impact force exerted on said cable exceeds said preestablished threshold, said coils plasticly deform and said second end portion is displaced relative to said first end portion.

21. The safety cable system of claim 20 said enclosure comprises a tube, and said first and second end portions comprise end caps.

* * * * *